(12) United States Patent
Mohtasham

(10) Patent No.: US 6,418,592 B1
(45) Date of Patent: Jul. 16, 2002

(54) ROPE GRIPPER

(75) Inventor: Mehdi Mohtasham, Manchester (GB)

(73) Assignee: EJA Limited, Lancashire (GB)

( * ) Notice: Subject to any disclaimer, the term of this patent is extended or adjusted under 35 U.S.C. 154(b) by 0 days.

(21) Appl. No.: 09/675,859

(22) Filed: Sep. 29, 2000

(51) Int. Cl.⁷ .......................... F16G 11/00; B63B 21/04
(52) U.S. Cl. .................................. 24/134 P; 24/134 L
(58) Field of Search .......................... 24/134 R, 134 L, 24/134 P, 134 N, 115 M, 132 AA, 135 R; 114/199, 218; 188/65.1

(56) References Cited

U.S. PATENT DOCUMENTS

| | | | | |
|---|---|---|---|---|
| 903,818 | A | * 11/1908 | Herth | ........................ 24/134 P |
| 1,141,790 | A | * 6/1915 | Furth | ..................... 24/134 P X |
| 1,520,716 | A | * 12/1924 | Judd | ........................ 24/134 P |
| 2,444,841 | A | * 7/1948 | Meronk | .................. 24/134 P X |
| 4,889,320 | A | 12/1989 | Pasbrig | |
| 5,306,885 | A | * 4/1994 | Utke | ..................... 24/136 R X |
| 5,852,853 | A | * 12/1998 | Pennoyer, Jr. | ............ 24/134 P |

FOREIGN PATENT DOCUMENTS

| FR | 590310 | 6/1925 |
|---|---|---|
| GB | 786155 | 1/1957 |

* cited by examiner

Primary Examiner—Robert J. Sandy
(74) Attorney, Agent, or Firm—William R. Walbrun; Alexander M. Gerasimow; R. Scott Speroff

(57) ABSTRACT

A rope gripper for connecting for example a rope operated switch to a rope. The gripper comprises a body defining a passage into which a rope can be inserted. Two jaws are mounted eccentrically on pivot pins on either side of the passage and biased towards the passage such that they are pressed against an inserted rope. The jaws are shaped and mounted such that movement of an inserted rope in one direction along the passage drives the jaws towards the rope, causing the rope to be jammed within the passage, whereas movement of the rope in the opposite direction along the passage drives the jaws to a position in which the rope is free to slide.

12 Claims, 5 Drawing Sheets

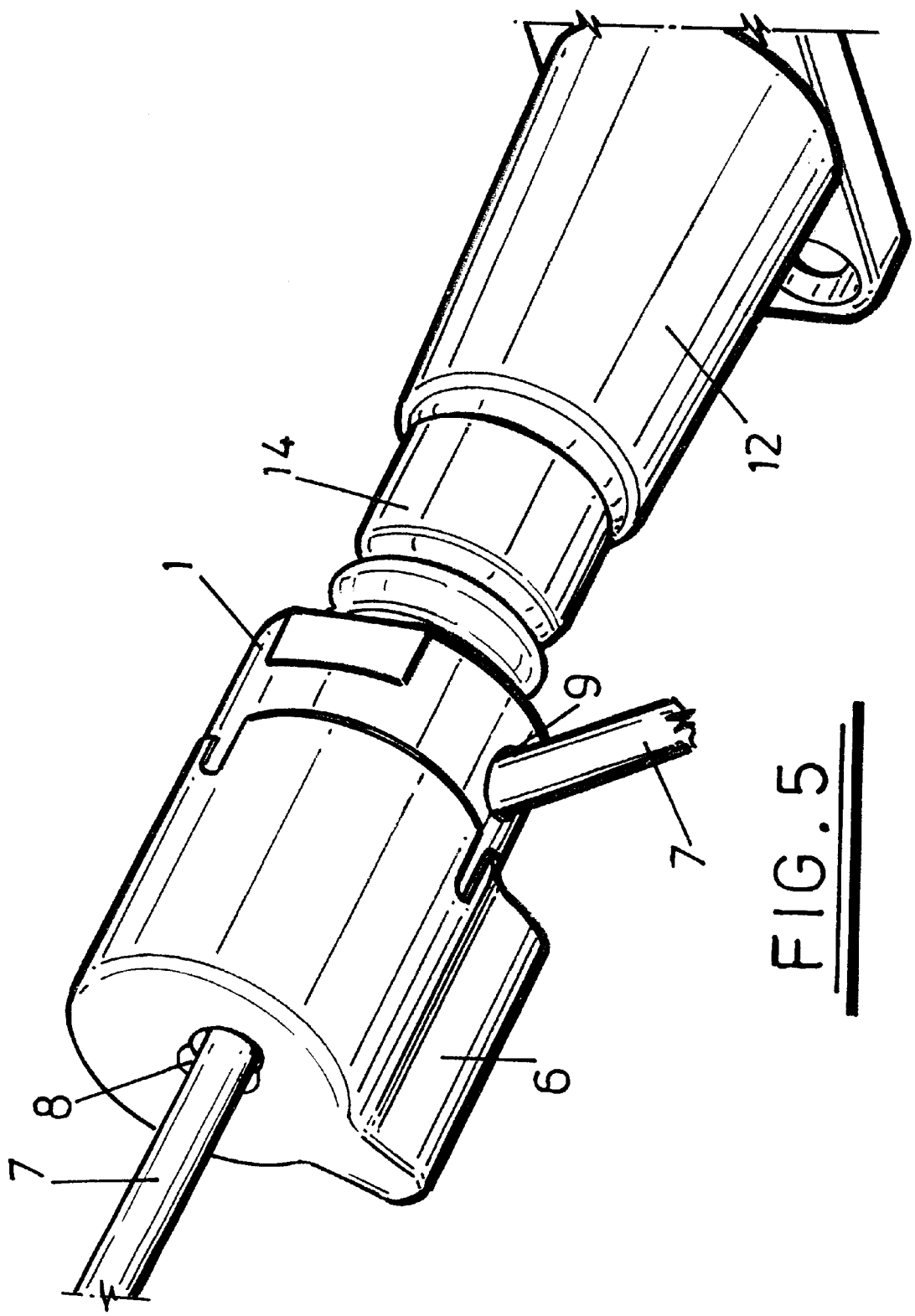

ROPE GRIPPER

TECHNICAL FIELD

The present invention relates to a rope gripper which may be used with a rope operated switch assembly. Such an assembly may be used, particularly but not exclusively, for controlling the power supply to kinetic machinery.

BACKGROUND ART

Rope operated switch assemblies are generally fitted in proximity to a machine or around any area which requires protection, and generally comprise two safety switches and a rope connected to each of the switches using thimbles and cable clamps such that the electrical power supply may be turned off when the rope is pulled or slackened (e.g. if the rope is cut). In some applications, only one switch is provided, one end of the rope being connected to the single switch and the other end being connected to for example a spring secured to a fixed point. The rope is generally a plastics-coated metal wire or cable, and extends around the machine so that an operator can easily reach it from any position adjacent the machine. The term "rope" used hereinafter is intended to mean any elongate flexible element that is suitable for use in a rope operated switch assembly, for example, metal cable, cord formed of twisted elements or fibres such as wire, polymeric material, etc., which may optionally be coated with a plastics material.

The rope must be installed at the correct tension so that the machinery can be operated. Thereafter a relatively small change in the tension of the rope must actuate the switch assembly. This is important because an injured operator may not be able to pull the rope with much force.

The installation of the rope at the correct tension is difficult to achieve. The rope must first be installed between the two switches, and is then pulled tight to an approximation of the correct tension. The tension can be adjusted using a turnbuckle installed in the centre of the rope by cutting the rope and fixing the turnbuckle between the rope sections using thimbles and cable clamps. Once installed, the tension in the rope is set by adjusting eye bolts on the turnbuckle until the rope switches are pulled into a "run" position, that is, with safety contacts in the switches made. The turnbuckle then allows small alterations to be made to the tension of the rope to allow for expansion or contraction of the rope due to, for example, temperature differences. Thus in most applications four rope ends must be connected either to a rope switch or to a turnbuckle. The making of such connections can take up a large proportion of the total time taken to install the rope switch assembly.

DISCLOSURE OF INVENTION

It is an object of the present invention to obviate or mitigate the above disadvantages by providing a rope gripper which can be used to simplify the process of attaching a rope to for example a rope switch.

According to the present invention there is provided a rope gripper comprising a body defining a passage into which a rope to be gripped may be inserted, and at least one jaw displaceably mounted adjacent the passage and biased towards a position in which it engages an inserted rope, the at least one jaw being shaped and mounted such that movement of an inserted rope in one direction relative to the passage drives the jaw towards a position in which the rope is jammed within the passage and movement of the rope in the opposite direction drives the jaw to a position in which the rope can slide past the jaw.

Thus, a rope switch installation can be set up quickly and easily simply by positioning rope switches in appropriate locations, coupling rope grippers to each of those rope switches, and pulling rope ends through the rope grippers until an appropriate rope tension has been achieved. If fine control of the rope tension is required, a tensioning device such as a turnbuckle can be introduced into the rope by connecting rope grippers in accordance with the invention to the turnbuckle, cutting the rope, and then attaching the cut rope ends to the turnbuckle using the rope grippers. With such an arrangement, installers do not have to spend time manipulating conventional cable clamps and associated components.

Preferably the or each jaw is eccentrically mounted on a pivot pin such that rotation of the jaw as a result of rope movement in the rope jamming direction causes the jaw to progressively obstruct the passage, thereby increasing pressure on the rope until further rope movement is prevented. Two jaws may be arranged on opposite sides of the passage, and the jaws may be biased inwards towards the passage by springs depending from an annular spring member extending around the passage.

Preferably the passage comprises a first straight section which extends from a rope receiving aperture at one end of the body to a second straight section which extends to a rope exit aperture on one side of the body, means being provided at the end of the body remote from the receiving aperture for connecting the body to a further device such as a rope switch or a rope tensioning device such as a turnbuckle.

The invention also provides a method for installing a rope switch using a gripper as defined above and coupling that gripper to an actuator of a rope switch.

BRIEF DESCRIPTION OF DRAWINGS

An embodiment of the present invention will now be described, by way of example, with reference to the accompanying drawings, in which:

FIG. 5 is a perspective view of the rope gripper of FIG. 2 attached to a rope switch.

BEST MODES FOR CARRYING OUT THE INVENTION

Figure 1:
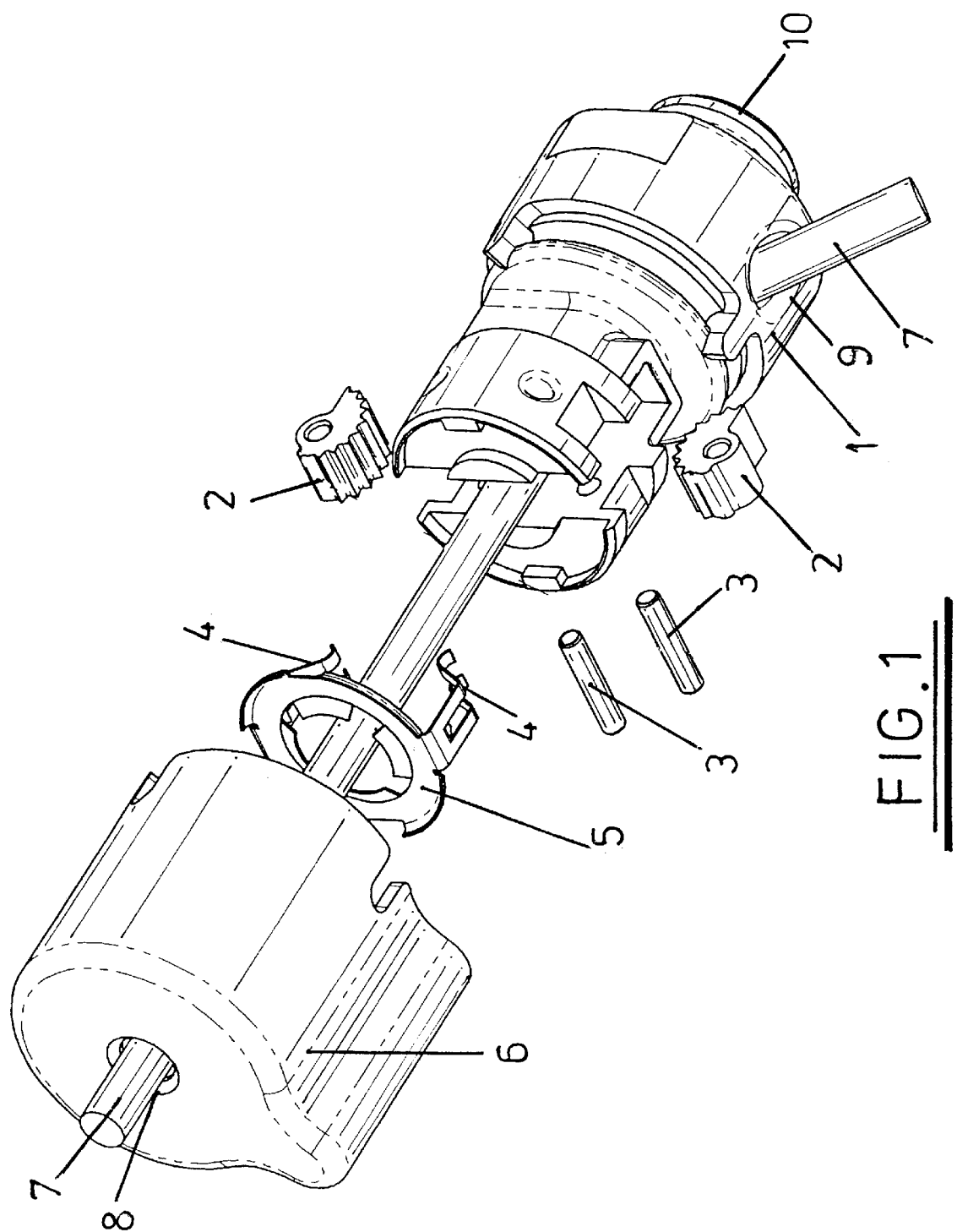
FIG. 1 is an exploded perspective view of a rope gripper according to the present invention.
Figure 2:
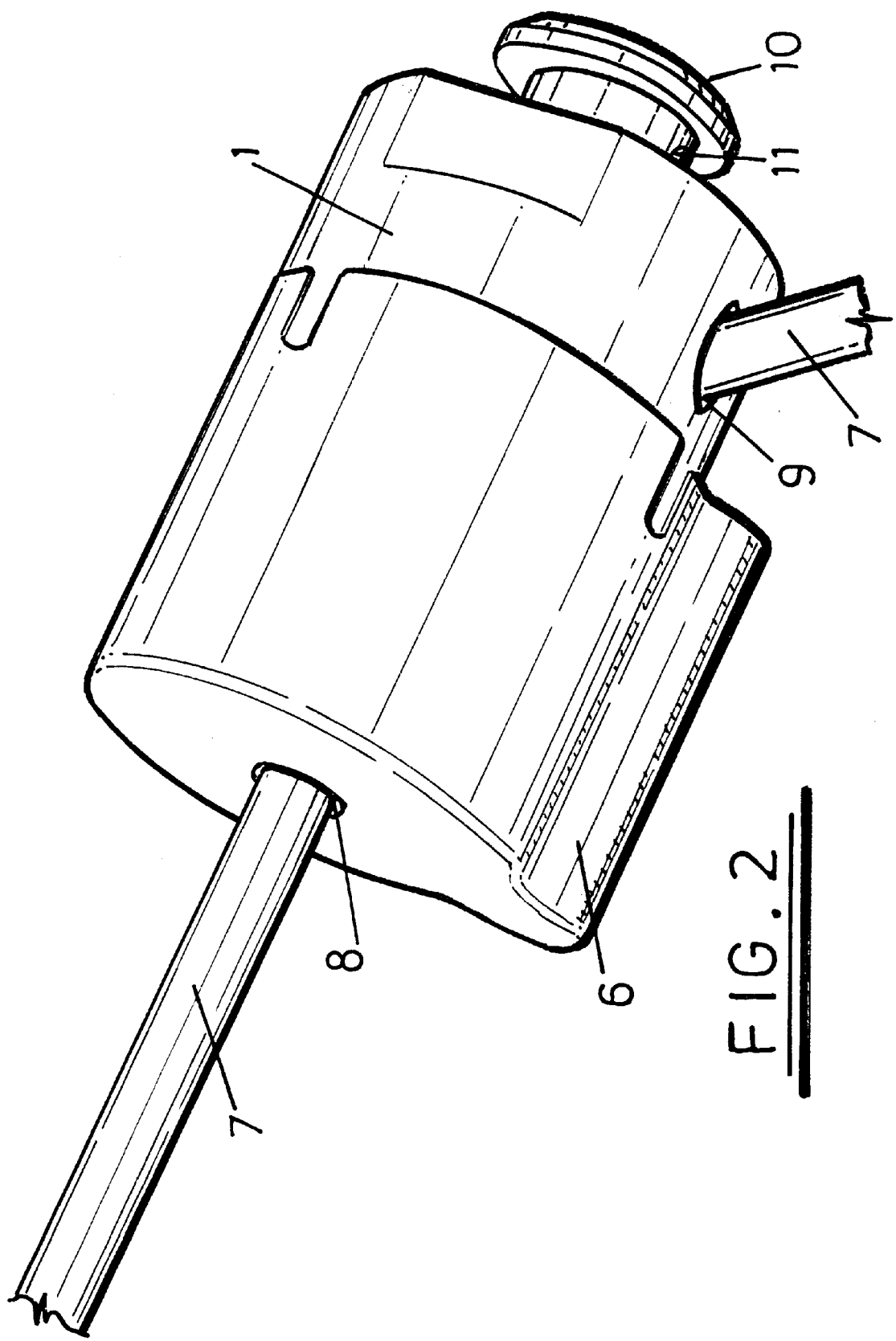
FIG. 2 is a perspective view of the rope gripper of FIG. 1.

Referring to the accompanying drawings, the illustrated rope gripper comprises a main body 1 rotatably supporting toothed jaw members 2 eccentrically mounted on hinge pins 3. The jaws are biased together by dependent arms 4 of an annular spring 5. A main cover 6 extends over the jaw assembly. A rope 7 (for example PVC coated steel cable, although any suitable rope may be used) passes through the rope gripper from a receiving aperture 8 to an exit aperture 9. An engaging member 10 defining a pin-receiving aperture 11 extends from the main body 1.

Figure 3:
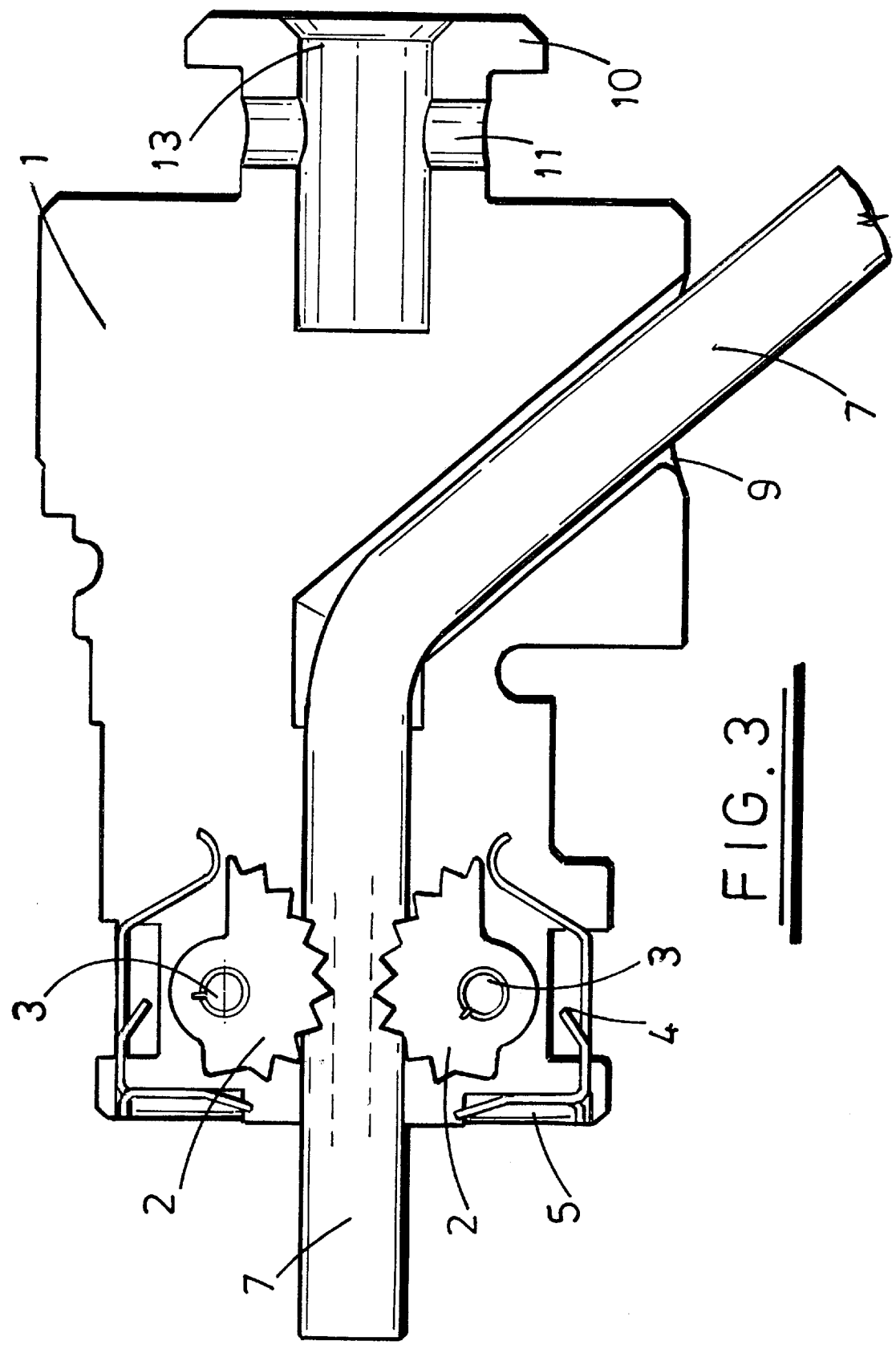
FIG. 3 is an axial cross-section through the rope gripper of FIGS. 1 and 2.
Figure 4:
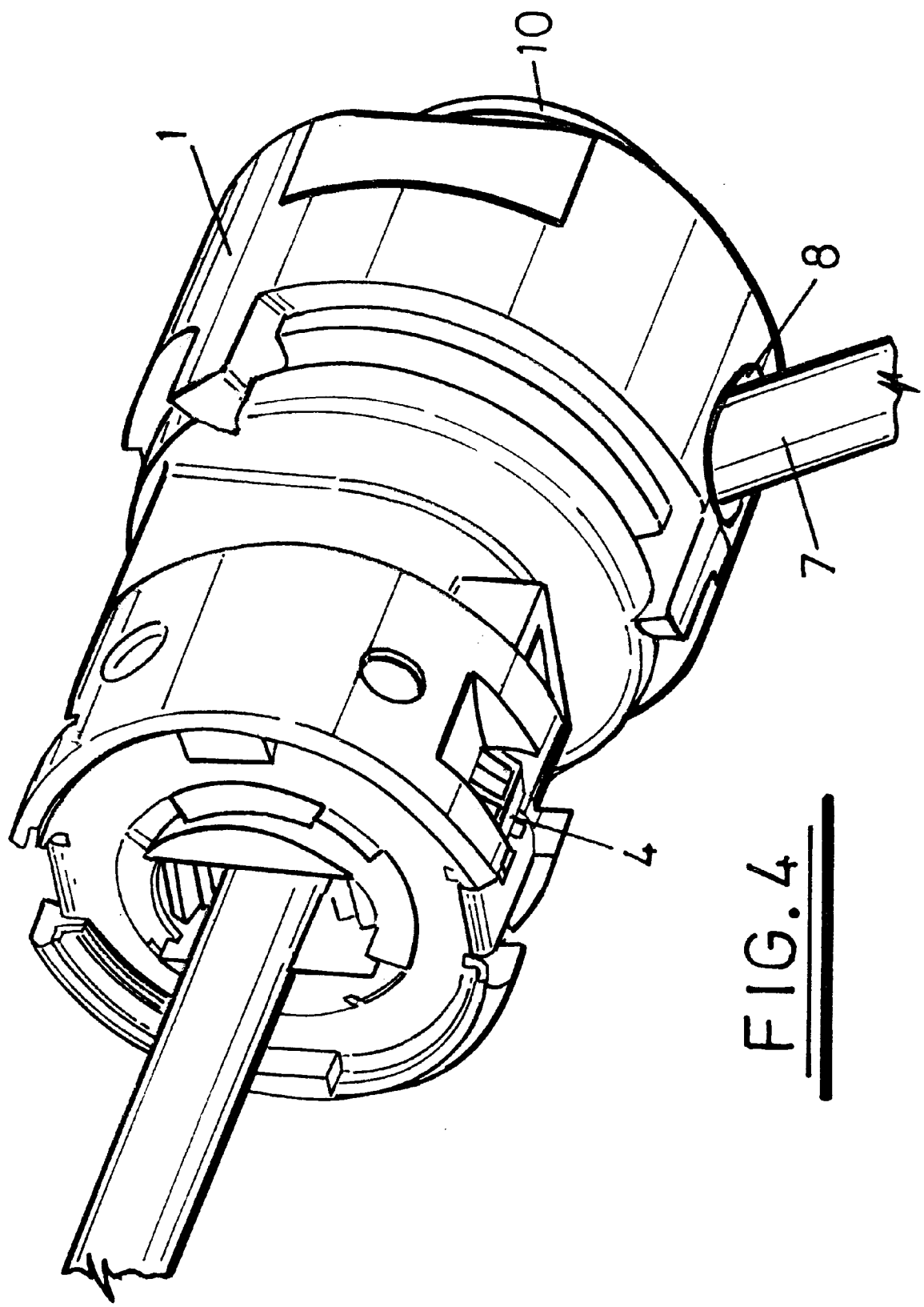
FIG. 4 is a perspective view of the rope gripper of FIG. 2, after removal of a cover.

The rope gripper may be connected to a rope switch as shown in FIG. 5. The rope switch has a body 12 encasing a plunger (not shown) an end of which is received in an axial bore 13 (FIG. 3) defined within the engaging member 10. The plunger end defines a through bore which receives a pin (not shown) inserted through the aperture 11. A rubber jacket 14 is then snapped over the interconnection between the gripper body 1 and the rope switch body 12.

The rope 7 is inserted into receiving aperture 8 of the rope gripper and pushed in until it abuts against jaw members 2. Further pressure causes the jaw members 2 to swing apart on pins 3 against a spring bias provided by dependent members 4 of spring 5, such that the rope can be pushed between the jaw members 2. The end portion of the rope is then directed into a channel leading to the exit aperture 9.

The rope is pulled to an approximation of the correct tension during installation. The tension in the rope is then increased by applying tension to the end portion of the rope extending from the exit aperture 9. When the desired tension is reached the rope is released. Release of the applied tension causes the rope 7 to pull back between the jaw members 2. The teeth on the jaw members grip the rope, causing the jaw members to turn, thereby reducing the spacing between the jaw members 2. Therefore the rope is securely gripped and cannot be pulled out of the gripper in the direction towards the receiving aperture 8.

Although not shown, means may be provided for pulling back the jaw members 2 against the bias delivered by the spring members 4 to release a gripped rope.

What is claimed is:

1. A rope gripper comprising a body defining a passage into which a rope to be gripped may be inserted, and at least one jaw displaceably mounted adjacent the passage and biased towards a position in which it engages an inserted rope, the at least one jaw being shaped and mounted such that movement of an inserted rope in one direction relative to the passage drives the jaw towards a position in which the rope is jammed within the passage and movement of the rope in the opposite direction drives the jaw to a position in which the rope can slide past the jaw, the passage having a first section which extends from a rope receiving aperture at one end of the body to a second section which extends to an exit aperture on one side of the body, the first section and second section being in a generally V-shaped angular relationship to one another, and a connection portion is provided at the end of the body remote from and co-axial with the receiving aperture for connecting the body to a further device.

2. A rope gripper according to claim 1, wherein the at least one jaw is eccentrically mounted on a pivot such that rotation of the jaw as a result of rope movement in the said one direction causes the jaw to progressively obstruct the passage.

3. A rope gripper according to claim 2, comprising two jaws arranged on opposite sides of the passage.

4. A rope gripper according to claim 1, comprising two jaws arranged on opposite sides of the passage.

5. A rope gripper according to claim 4, wherein the jaws are biased inwards towards the passage by springs depending from an annular spring member extending around the passage.

6. A rope gripper according to claim 4, wherein the two jaws are arranged on opposite sides of the first section.

7. A rope gripper according to claim 1, wherein the connection portion is connected to a rope operated switch actuator.

8. A method of rope gripping, comprising:

providing a rope gripper having a body defining a passage with first and second sections into which a rope to be gripped may be inserted and gripped;

extending the rope through the first and second sections so that rope is in a generally V-shaped angular relationship and extends to an exit aperture on one side of the body of the rope gripper; and connecting the rope gripper to a rope operated switch so that the first section and a body of the rope operated switch are generally co-axial.

9. The method of claim 8, wherein the rope is gripped within first passage with a jaw displaceably mounted adjacent the first section and biased towards a position in which it engages the rope.

10. A rope gripper comprising a body defining a passage into which a rope to be gripped may be inserted, and at least one jaw displaceably mounted adjacent the passage and biased towards a position in which it engages an inserted rope, the at least one jaw being shaped and mounted such that movement of an inserted rope in one direction relative to the passage drives the jaw towards a position in which the rope is jammed within the passage and movement of the rope in the opposite direction drives the jaw to a position in which the rope can slide past the jaw, wherein the jaws are biased inwards towards the passage by springs depending from an annular spring member extending around the passage.

11. A rope gripper according to claim 10, wherein the at least one jaw is eccentrically mounted on a pivot such that rotation of the jaw as a result of rope movement in the said one direction causes the jaw to progressively obstruct the passage.

12. A rope gripper according to claim 10, comprising two jaws arranged on opposite sides of the passage.

* * * * *